United States Patent [19]

Alves

[11] Patent Number: 4,944,641

[45] Date of Patent: Jul. 31, 1990

[54] CLUTCH ENGAGER SLEEVE

[76] Inventor: Andre Alves, 1429 Shore Pkwy., Brooklyn, N.Y. 11214

[21] Appl. No.: 392,723

[22] Filed: Aug. 2, 1989

[51] Int. Cl.⁵ .............................................. B23B 51/12

[52] U.S. Cl. ..................................... 408/239 A; 7/158; 279/1 A

[58] Field of Search ............. 29/560; 408/239 A, 226, 408/238, 239 R; 279/1 A, 8; 81/177.2; 7/158; 403/24

[56] References Cited

U.S. PATENT DOCUMENTS

| | | | |
|---|---|---|---|
| 3,336,611 | 8/1967 | Schepp | 7/158 |
| 3,843,143 | 10/1974 | Laxson | 279/1 A |
| 4,224,969 | 9/1980 | Plessner | 403/24 |
| 4,349,929 | 9/1982 | Dewey | 408/226 X |

*Primary Examiner*—William Briggs

*Attorney, Agent, or Firm*—Edwin D. Schindler

[57] ABSTRACT

A clutch engager sleeve which is capable of engaging a screw gun is disclosed. The engager sleeve is able to be secured to the screw gun, preferably by means of a threaded lock down collar. Preferably, the clutch engager is secured to the screw gun via a shank, with which it is provided. The clutch engager contacts a drill chuck by screwing the drill chuck to, preferably, its thread, and then driving a screwhead of a reverse lock down screw to secure the chuck from its front directly to the clutch engager. This arrangement prevents the chuck head from coming off in the reverse mode. The clutch engager effectively provides the necessary pressure in both forward and reverse modes.

7 Claims, 1 Drawing Sheet

Fig.1
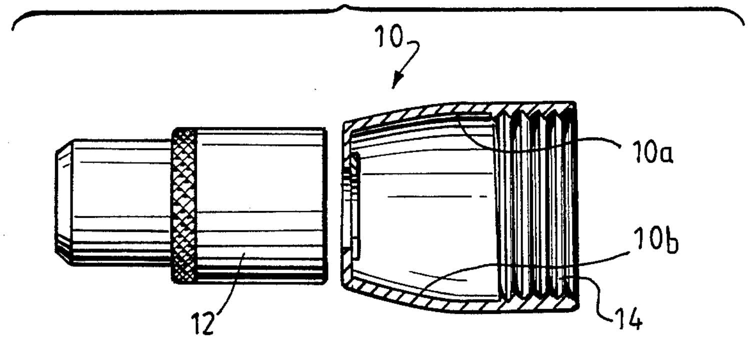
Fig.2
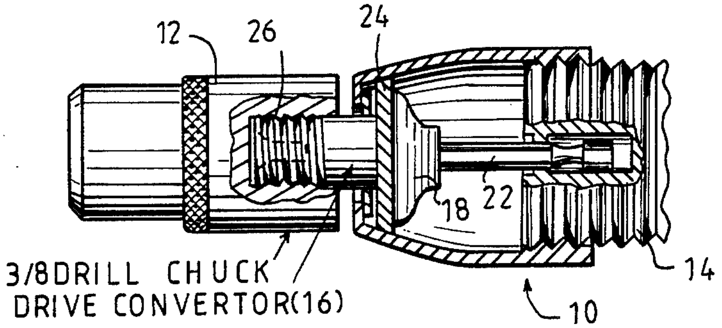
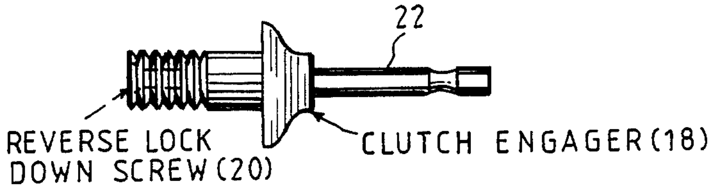
Fig.3

CLUTCH ENGAGER SLEEVE

BACKGROUND OF THE INVENTION

1. Technical Field of Invention

The present invention relates to a clutch engager sleeve. More particularly, the present invention relates to a converter for electricity powered screw guns which is capable of adapting such guns for operation as high torque drills capable of operation in reverse, as well as the conventional forward mode.

2. Description of the Prior Art

Electric screw guns, whether of the portable battery driven- or line-operated variety have been adapted to perform a drilling function by means of various converters. However, conventional converters presently known to the prior art do not provided sufficient torque to properly accomplish the desired drilling function. This can readily be ascertained by the usual stalling of the drills at the break through point of various materials being drilled. Furthermore, this lack of torque manifests itself insofar as that such conventional conveyors are incapable of operating at full power in a reverse mode.

Representative of the state of the art is an adaptor manufactured and sold by Work Tools of Los Angeles, Calif., which holds round drill bits and fits most cordless screwdrivers via an hex shank, but which according to the manufacturer's warning, should not be used in a reverse. The Work Tools' adaptor is described in the Jul. 1989 issue of *Popular Science* magazine at page 60.

The deficiencies of prior art adaptors are more fully understood by the application of some basic principles of physical mechanics. It is known that torque is a function of force and, in relation to a screw gun adaptor of radius "r"

$$T=Fr$$

wherein,
T represents the torque; and,
F represents the force.
It is further known that torque is a function of angular momentrum (L) with respect to time (t):

$$T=dL/dt=Fr$$

The adaptors presently known to the prior art do not transmit the full power of their force available in the screw gun and dissipate the effective radius of the same. Thus, their angular momentum is not sufficient to overcome a reverse torque resistance generated by the work object with ease and, moreover, are hardly sufficient to operate in the reverse mode.

SUMMARY OF THE INVENTION

It is, therefore, an object of the present invention to provide means for converting conventional electric screw guns to function as power drills in both a forward and reverse mode.

It is a further object of the present invention to provide means for modifying electrical screw guns as so to permit them to function as power drills which would lack the tendency of known power drills to seize or stall due to the high torque engendered in the converter.

The foregoing and related objects are achieved by providing a clutch engager sleeve which is capable of engaging a screw gun. The engager sleeve is secureable to the screw gun, preferably by means of a threaded lock down collar. Preferably, the collar, which may be threaded, is constructed to compliment an analogous securement means of a conventional screw gun. Most preferably, the clutch engager is secured to the screw gun via a shank, with which it is provided. Preferably, the clutch engager contacts a drill chuck by screwing the drill chuck to, preferably, its thread, and then driving a screwhead of a reverse lock down screw to secure the chuck from, preferably, its front directly to the clutch engager. This arrangement prevents the chuck head from coming off in the reverse mode.

In a particularly preferred embodiment of the present invention, the clutch engager of the invention may be designed to be secured to the screw gun via a hexagonal shank. It should, of course, be recognized that other modes of engagement are possible, including shanks of substantially different configuration, as well as possible securement without the use of a shank.

Other objects and features of the present invention will become apparent to those skilled in the art when the present invention is considered in veiw of the accompanying drawing figures. It should, of course, be recognized that the accompanying drawing figures illustrate a preferred embodiment of the present invention and are not intended as a means for defining the limits and scope of the present invention.

BRIEF DESCRIPTION OF THE DRAWING

In the drawing figures, wherein similar reference numerals denote similar features throughout the several views:

FIG. 1 shows a side view of a threaded lock down collar for connecting the clutch engager sleeve to a screw gun;

FIG. 2 is a cross-sectional, side view showing the drill chuck of the present invention engaging the drive converter and, further, how the clutch engager sleeve traverses a washer securing the same in place with its collar; and, FIG. 3 is an elevational view showing the reverse lock down screw in combination with the clutch engager and shank.

DETAILED DESCRIPTION OF THE DRAWING AND PREFERRED EMBODIMENTS

Turning now, in detail, to an analysis of the drawing figures, FIG. 1 shows a lock down collar 10 for eventual engagement of the clutch engager of the present invention to a given screw gun for eventural use. FIG. 1 also includes an elevational view of drill chuck 12 prior to engagement. In a preferred embodiment of the invention, the lock down collar is threaded 14 for eventual securement to a screw gun (not shown.) Lock down collar 10 further includes collar sections, designated by reference numerals 10*a*, 10*b*, which are preferably designed to suit various, commercially available screw guns. The lock down collar preferably has a diameter of $1\frac{3}{8}$" and the collar portions 10*a*, 10*b* preferably each have a length of $1\frac{1}{8}$". The precise dimensions, of course, may be varied, depending upon the need of the user with the scope of the present invention encompassing all suitable variations thereof.

FIG. 2 illustrates, in addition to lock down collar 10 and drill chuck 12, drive converter 16 and clutch engager sleeve 18, which includes reverse lock down screw 20 (see, FIG. 3.)

More particularly, as illustrated in the preferred embodiment of the drawing figures, drive converter 16, having a threaded shape, is designed to substantially compliment the thread of drill chuck 12. Drive converter 16 is further shown having a cavity to accommodate reverse lock down screw 20, which securely fastens drill chuck 12 into an intended configuration. Extending from the clutch engager, opposite the reverse lock down screw, is a shank 22, preferably having a hexagonal configuration, which engages a screw gun (not shown) and is further held in place by the threaded lock down collar (10), which substantially compliments the thread of a screw gun mate and traverses a stabilizing washer 24, preferably made of stainless steel, which, in turn, presses upon a mid-portion of clutch engager sleeve 18 without interfering with its ability to rotate.

In operation, screwhead 26 of clutch engager sleeve 18 works to prevent the chuck end from disengaging in a reverse operating mode. The clutch engager of the present invention acts to provide the necessary engaging pressure in either a forward or reverse mode, unlike prior art devices, which provide an engaging pressure in solely a forward operating mode.

It will be apparent to those of ordinary skill in the art that many modifications will be possible with respect to the present invention. For example, a preferred embodiment of the invention accommodates drill sizes from 1/16th to $\frac{3}{8}$ths of an inch.

While only several embodiments of the present invention have been shown and described, it will be obvious to those of ordinary skill in the art that many modifications may be made to the present invention without departing from the spirit and scope thereof.

What is claimed is:

1. A clutch engager sleeve for a drill gun having a forward mode and a reverse mode, comprising:

- a drive converter capable of receiving a reverse lock down screw;
- a drill chuck having a cavity, said drill chuck being secured to said drive converter;
- a clutch engager adjacent said drive converter, said clutch engager providing pressure for a forward mode and a reverse mode;
- a shank extending from said clutch engager, said shank being capable of engagement with a screw gun; and,
- a lock down collar for securing said shank and applying pressure to said clutch engager in the forward mode and the reverse mode.

2. The clutch engager sleeve according to claim 1, wherein said drive converter and said drill chuck are each complementary threaded for securement to one another.

3. The clutch engager sleeve according to claim 1, wherein said shank has a hexagonal configuration for engagement to a screw gun.

4. The clutch engager sleeve according to claim 1, wherein said lock down collar is treaded so as to be capable of engagement with a screw gun.

5. The clutch engager sleeve according to claim 1, further comprising means for stablizing said clutch engager in place with said lock down collar.

6. The clutch engager sleeve according to claim 5, wherein said means for stablizing is a washer adjacent said clutch engager.

7. The clutch engager sleeve according to claim 6, wherein said washer is made of stainless steel.

* * * * *